United States Patent
Kumar et al.

(10) Patent No.: US 10,197,177 B2
(45) Date of Patent: Feb. 5, 2019

(54) COMPRESSOR THERMAL VALVE UNIT TO ROUTE LUBRICANT USED IN A COMPRESSOR

(71) Applicant: Ingersoll-Rand Company, Davidson, NC (US)

(72) Inventors: Subodh Kumar, Huntersville, NC (US); Douglas W. Bissonnette, Harrisburg, NC (US); Christopher D. Taylor, Mooresville, NC (US)

(73) Assignee: Ingersoll-Rand Company, Davidson, NC (US)

( * ) Notice: Subject to any disclaimer, the term of this patent is extended or adjusted under 35 U.S.C. 154(b) by 80 days.

(21) Appl. No.: 15/075,605

(22) Filed: Mar. 21, 2016

(65) Prior Publication Data
US 2017/0268685 A1  Sep. 21, 2017

(51) Int. Cl.
| F16K 31/00 | (2006.01) |
| F04C 29/02 | (2006.01) |
| F16K 27/00 | (2006.01) |
| F28D 15/00 | (2006.01) |
| F28F 27/02 | (2006.01) |
| F04C 18/16 | (2006.01) |
| F28D 21/00 | (2006.01) |

(52) U.S. Cl.
CPC .......... *F16K 31/002* (2013.01); *F04C 29/02* (2013.01); *F16K 27/00* (2013.01); *F28D 15/00* (2013.01); *F28F 27/02* (2013.01); *F04C 18/16* (2013.01); *F28D 2021/0049* (2013.01)

(58) Field of Classification Search
CPC ........ F16K 31/002; F16K 27/00; F28D 15/00; F28F 27/02
See application file for complete search history.

(56) References Cited

U.S. PATENT DOCUMENTS

| 3,873,239 A | 3/1975 | Jamieson |
| 3,876,401 A | 4/1975 | Sturgill |
| 4,648,815 A | 5/1987 | Williams |
| 5,033,944 A | 7/1991 | Lassota |
| 5,795,136 A | 8/1998 | Olsaker et al. |
| 2005/0217221 A1* | 10/2005 | Stickland .............. F04C 29/026 55/319 |
| 2007/0241627 A1 | 10/2007 | Kharsa |
| 2012/0073792 A1* | 3/2012 | Dearborn ................ F24B 5/028 165/154 |
| 2013/0270472 A1* | 10/2013 | Crochet, Sr. ............ F16K 27/00 251/214 |
| 2015/0118076 A1 | 4/2015 | Grassbaugh |

* cited by examiner

*Primary Examiner* — Len Tran
*Assistant Examiner* — Gordon Jones
(74) *Attorney, Agent, or Firm* — Taft Stettinius & Hollister LLP (57) ABSTRACT

A thermal valve unit is provided for use with an oil filled screw compressor. The thermal valve unit can be affixed to an exterior pipe segment and can include a thermally responsive element in thermal communication with compressed air traversing through the pipe segment. The valve unit can include a movable valve member actuated by the thermally responsive element that opens and closes oil passages to selectively route oil either to a heat exchanger prior to being delivered to the oil filled compressor, or directly to the compressor without passing through the heat exchanger.

17 Claims, 7 Drawing Sheets

COMPRESSOR THERMAL VALVE UNIT TO ROUTE LUBRICANT USED IN A COMPRESSOR

TECHNICAL FIELD

The present invention generally relates to compressor based thermal valve units, and more particularly, but not exclusively, to thermal valve units that control passage of a fluid based upon the sensed temperature of another fluid.

BACKGROUND

Providing compression systems that utilize lubricant in a compression process with lubricant at an appropriate temperature remains an area of interest. Some existing systems have various shortcomings relative to certain applications. Accordingly, there remains a need for further contributions in this area of technology.

SUMMARY

One embodiment of the present invention is a unique thermal valve unit. Other embodiments include apparatuses, systems, devices, hardware, methods, and combinations for actuating passages for the conveyance of one fluid based on a temperature of another fluid. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
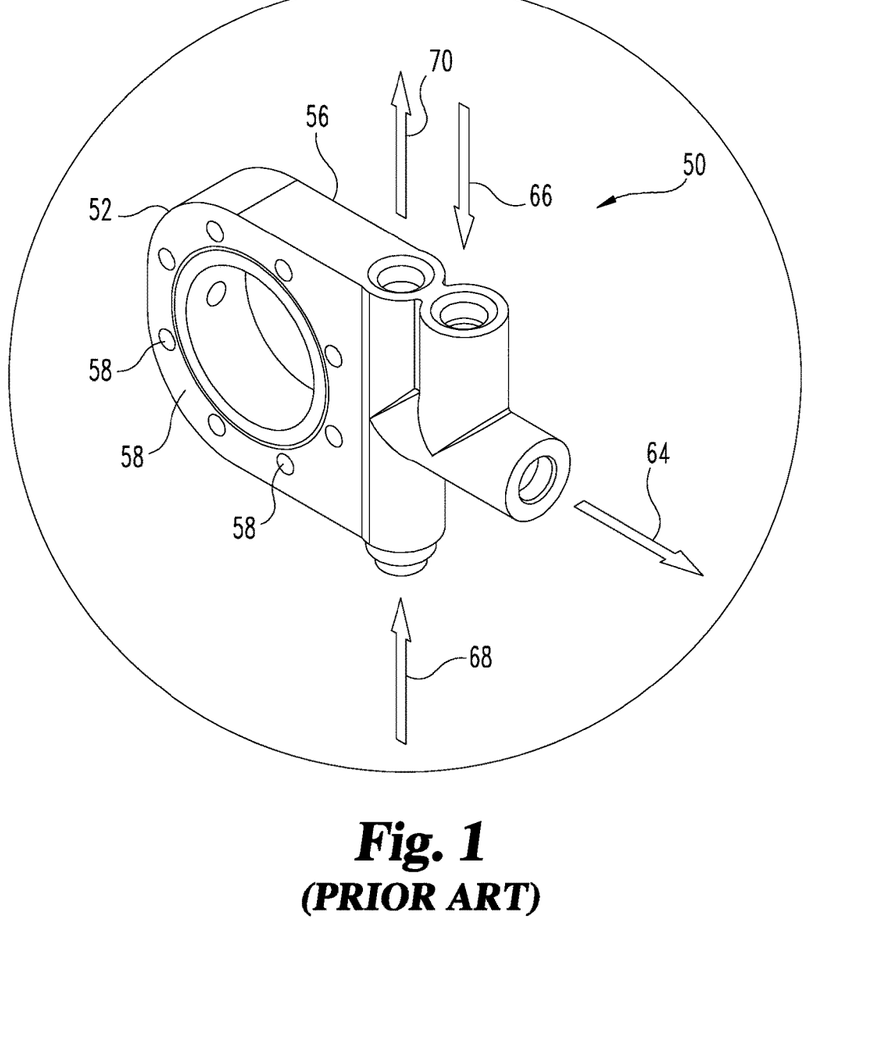
FIG. 1 depicts an embodiment of a prior art thermal valve unit.
Figure 2:
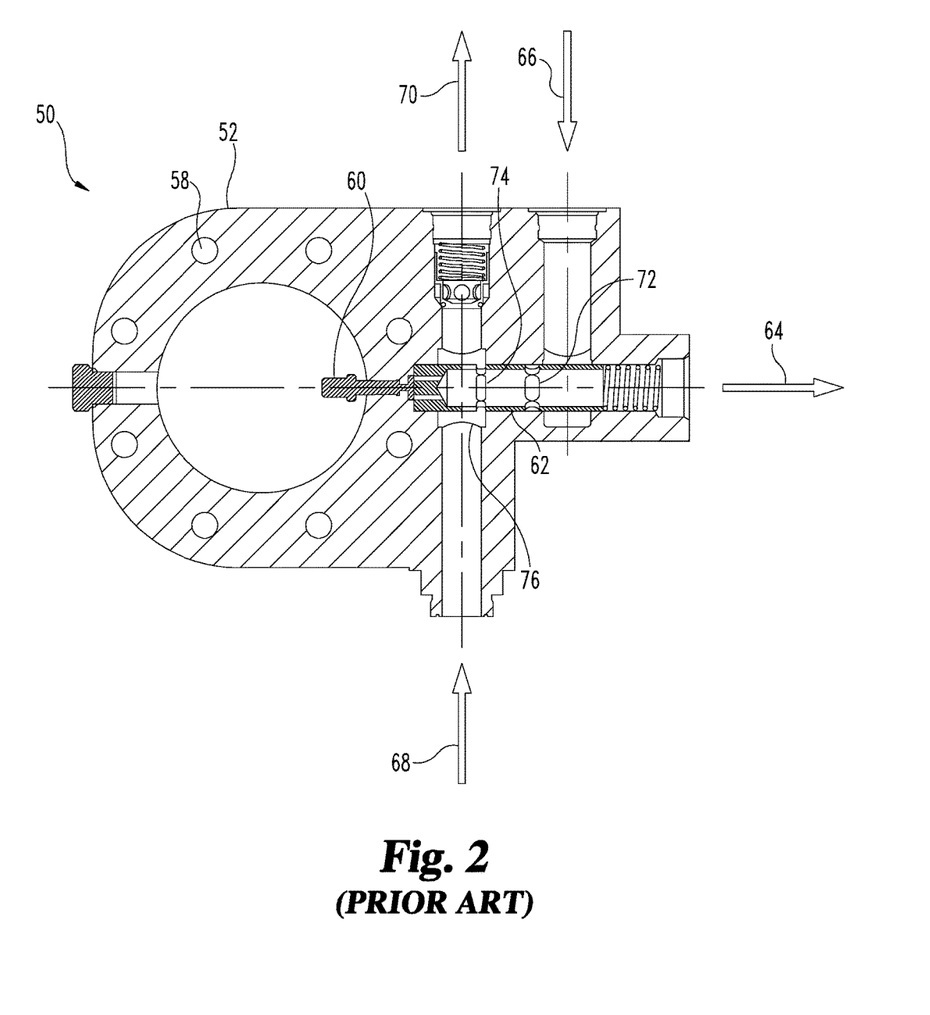
FIG. 2 depicts an embodiment of a prior art thermal valve unit.

With reference to FIGS. 1 and 2, a prior art thermal valve unit 50 is illustrated. The thermal valve unit 50 can be used with a compression system (not illustrated) useful for providing a source of compressed air such as for a facility. In one nonlimiting embodiment the compression system includes an oil filled screw compressor in which oil is used in conjunction with mechanical compressive elements of the screw compressor to assist in the compression process of air.

It is desired in some instances to thermally condition the oil such that it is neither too cool nor too hot when used with the mechanical compressive elements. Oil that is too cool may condense water vapor from an air stream to be compressed leading to undesirable amounts of liquid water in the system. Oil that is too hot may degrade compressor performance.

The thermal valve unit 50 is configured to be fitted between respective ends of neighboring compressor pipe, and includes a base 52 that is annular in nature and configured to fit between the ends of adjacent pipe. The circumferential extent of the annular shaped base includes a first axial abutment side 54 that is opposite a second axial abutment side 56, where the respective abutment sides 54 and 56 contact the respective ends of the neighboring adjacent pipe. The base includes apertures 58 which are configured to receive a fastening member, such as a bolt, fitted through corresponding apertures in a flange of compressor pipe.

The prior art thermal valve unit 50 also includes a thermally responsive element 60 that extends into a fluid flow stream of the pipes and which is mechanically connected with a valve 62, and a housing that includes a series of internal passages that can be selectively opened and closed depending on a movement of the valve 62 which is actuated by a temperature response of the thermally responsive element. The fluid passages leading to and away from the housing include oil from the sump (marked as reference arrow 68), oil to an oil cooler (marked as reference arrow 70), oil returning from the oil cooler (marked as reference numeral 66) and oil outbound to the compressor (marked as reference numeral 64). Depending on the valve position, oil can flow from 68 to 64, or can flow from 68, out through 70, returning from 66, and then to 64.

FIG. 2 depicts a cross sectional view of the embodiment illustrated in FIG. 1. The passages can be configured through action of the thermally responsive valve to route relatively warm oil returned from a sump of a compressor to an oil cooler for subsequent cooling in one mode of operation. In another mode of operation, oil that is returning from an oil sump can be routed to bypass the oil cooler and return directly to the compressor for further use in the compression process. The valve 62 includes apertures 72 which open to passage 66 when the thermally responsive element 60 urges the slidable valve element 62 to the right as seen in the figure. The valve element 62 is hollow to allow oil to pass from 68 directly to 64 via apertures 74 when the apertures 72 are closed off by the surrounding valve body. The valve body is enlarged at 76 to permit oil that proceeds from 68 to 70, then returns through 66 to flow through apertures 72 before exiting 64.

Figure 3:
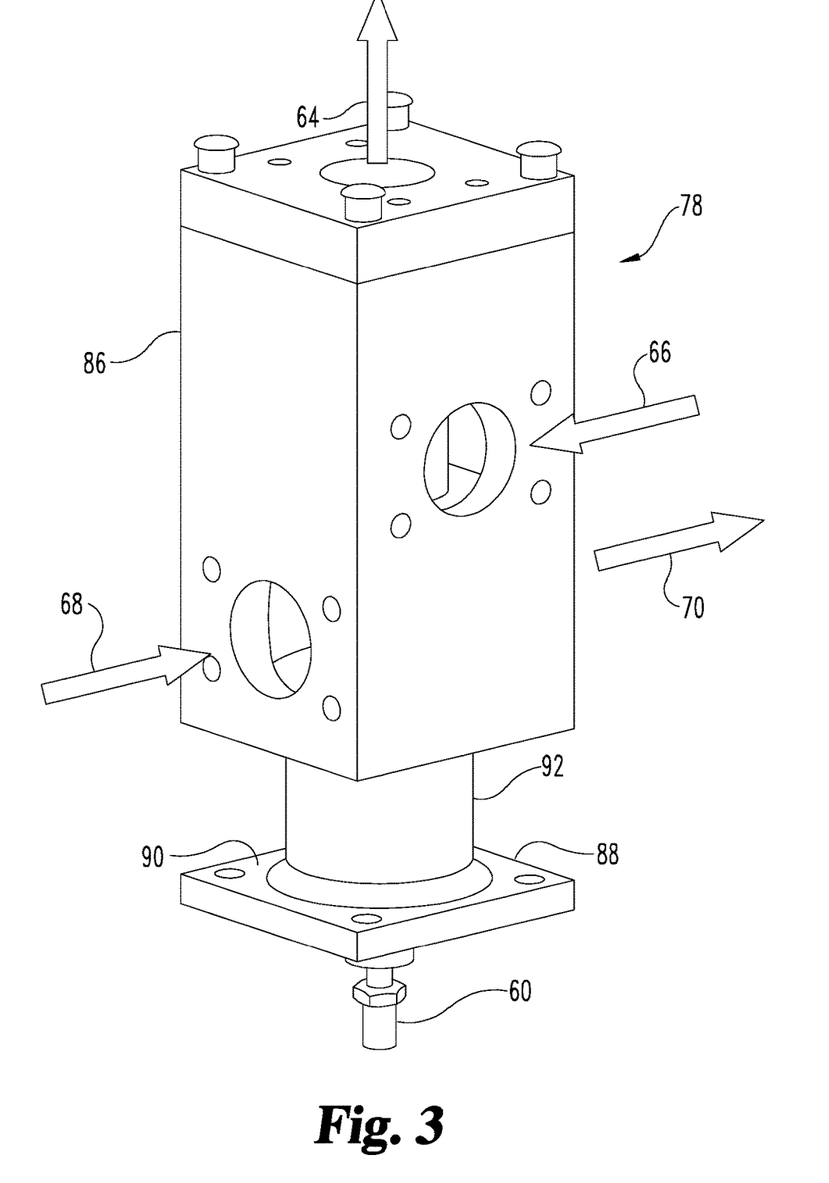
FIG. 3 depicts an embodiment of a thermal valve unit.
Figure 4:
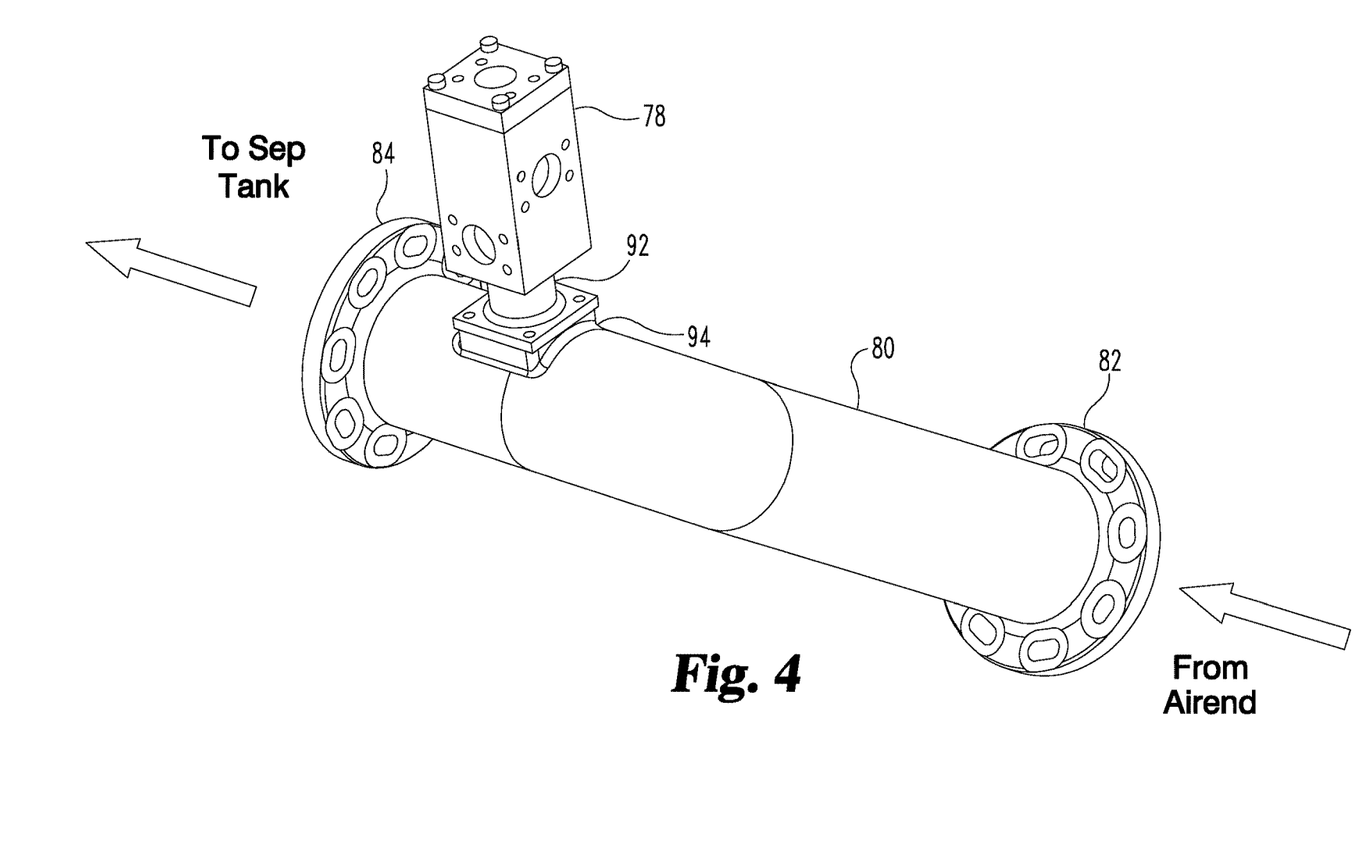
FIG. 4 depicts an embodiment of a thermal valve unit upon a pipe.

Turning now to FIGS. 3 and 4, one embodiment of the instant application includes a thermal valve unit 78 mounted not between pipe segments as in the embodiment above but rather upon a single pipe segment 80. The thermal valve unit 78 is affixed on an exterior section of compressor conduit pipe and located at a position intermediate the ends 82 and 84 of the compressor conduit pipe 80. In one form one or both of the ends 82 an 84 can include flanges (FIG. 4 showing an embodiment in which both ends are flanged) which permit the piping to be attached to other structures, such as an inlet or outlet of a subsystem, to another compressor conduit pipe, etc. In one nonlimiting form the compressor conduit pipe can be attached at one end to an exit of a compressor housing, and attached at the other end to a separator system.

The thermal valve unit 78 is used to regulate a temperature of oil used in the oil filled compressor (not illustrated in FIG. 4, but a schematic of which is discussed below). In oil filled compressors it is desired to use oil that is of sufficient temperature to avoid condensation of water vapor contained in an air stream used for compression, but not hot enough to impact compression efficiency. Thus, it can be desired in some situations to avoid use of an oil heat exchanger during those periods in which a temperature of the oil is low (such as, for example, during start up or low ambient temperature conditions), but to intentionally use oil that has traveled through an oil cooler/heat exchanger when the temperature of the oil is warm enough to impact compression efficiency (such as, for example, after warm up and/or during hot ambient conditions).

The thermal valve unit 78 can include many of the same features as shown above in FIG. 2. For example, the thermal valve unit 78 can include a thermally responsive element 60 which projects into a flow stream of compressed air, a valve 62 located internal to a housing 86, apertures (such as 72 and 74) to that operate in conjunction with a valve body to selectively open and close internal passages, and openings 64, 66, 68, and 70 to permit oil to flow between components as discussed above. The thermal valve unit 78 includes a base 88 which can be used to secure the unit 78 in place intermediate the housing 86 and the compressor pipe 88.

Though the thermally responsive element 60 in FIG. 3 is shown projecting away from the base 88 of the thermal valve unit 78 and into a flow stream of compressed air within the compressor pipe 80, not all embodiments need be exposed to the flow stream. For example, in some embodiments an intermediate structure can be used to provide thermal communication between the fluid in the pipe 80 to the valve but otherwise shield the thermal valve unit 78 from contact with the fluid. For example, a thermally conductive material can be exposed to the fluid and otherwise provide thermal conductivity between the fluid and the thermally responsive element 60. Such a thermally conductive material could be exposed to the fluid in the pipe while the thermally responsive element 60 is located radially inside a periphery of the housing 86 of the thermal valve. Other arrangements are also contemplated.

The base 88 can take the form of a flange 90 as depicted in FIG. 3 through which fastening devices (e.g. bolts) can pass to secure the base 88 to the pipe 80. The base 88 can have any number of apertures therethrough to permit insertion of fastening devices such as bolts to secure the base to the pipe. In some additional and/or alternative embodiments, the base can be chemically or metallurgically bonded to the pipe. Such metallurgical bonding can include a variety of techniques such as, but not limited to welding and brazing.

The base 88 includes an engagement surface (e.g. the underside of the base 88 depicted in FIG. 3) that is generally arranged to be transverse to the axis of the thermal responsive element 60. In some forms the underside of the base 88 can additionally and/or alternatively include a recess in the engagement surface into which can be placed a sealant such as, but not limited to, an O-ring to provide a fluid tight seal for the pipe 80.

In some forms, as in the illustrated embodiment, the base 88 is a component having larger footprint that an intermediate neck 92 which is located between the housing 86 and the base 88. The neck 92 in the illustrated embodiment includes a circular cross sectional shape, but can take on different shapes in other embodiments. In some alternative embodiments the base 88 can be the bottom side of the housing 86 such that the neck 92 is entirely absent.

The base 88 can be curved or flat depending on the needs in any given situation, and in some forms can be shaped to interface with an embossment on the pipe 80. In those embodiments where the base 88 is curved, the base 88 may extend only partially around the pipe 80 such that it can be directly affixed to the pipe 80 without being axially slid over an end of the pipe and into its fastening position.

The housing 86 depicted in the illustrated embodiment can be square in cross section and substantially the same outer dimensions along the length of the housing 86, but other shapes and sizes are also contemplated herein. For example, the housing 86 can be circular, conical, or any other geometric or non-geometric shape. As shown in the illustrated embodiment the housing 86 takes on a rectangular shape.

The housing 86 can be made from a variety of materials using a variety of techniques. In one form the housing 86 can be made from a stamped sheet metal construction into which is located a valve body to provide the internal, or it can be cast into net or near-net shape, among many other approaches and material types. In those embodiments in which a valve body is located within an external portion of the housing 86, such an external portion can be referred to as a shell within which various other passages and components of the thermal valve unit 78 reside. The shell can have a constant thickness throughout the housing. In some forms the shell includes internal structures useful to structurally support the housing.

The housing 86 is structured to be located external to the pipe 80 and in some applications can be exposed to environment conditions without aid of a covering. In these applications the compressor unit may not have an overall housing within which are located some or all of the components of the compressor unit such as the motor, compressor, tubing, etc.

In some embodiments the housing 86 can have fittings installed to facilitate connection to conduits/tubing/pipes/passages/etc. The fittings can take on a variety of forms. In some embodiments the housing 86 can include pre-formed holes through which a bolted connection can be made to route oil to/from various components such as an oil sump, oil heat exchanger, etc.

The pipe 80 can be used for industrial purposes such as the generation of compressed air made through the compressor systems discussed above. The pipe 80 includes a through passage for the bulk conveyance of compressed air (and possibly mixture of compressed air and oil) as discussed above. The pipe 80 can also include an opening in its outer cylindrical surface which permits exposure of the thermal valve unit 78 to fluid traversing the pipe 80. Such an opening can be bordered by the embossment mentioned above, and is generally located in most embodiments between the ends of the pipe. The opening in the pipe 80 can partially extend circumferentially around the outer part of the pipe 80.

The segment of pipe 80 can be any length (e.g. from a few inches to a few feet), and can be any configuration that includes straight pipe segments and curved pipe segments. In some forms the pipe 80 is formed as a coupler device that extends axially between two other large pipe segments.

As discussed above, the pipe 80 can include a mounting surface 94 upon which the thermal valve unit 78 will be coupled. The mounting surface can be curved or flat. The mounting surface 94 shown in FIG. 4 is depicted as an embossment having a relatively flat surface shape, but other forms are also contemplated herein. For example, the mounting surface 94 can take the form of a conventional exterior surface of a pipe segment. In some forms the base may connect direct to the pipe without an embossment in which case the base 88 may be a complementary shape to the exterior of the pipe. The embossment on the pipe 80 can be made from a variety of materials. In one form the embossment on the pipe 80 is made from a material separate from the pipe 80 and is later bonded.

Figure 5:
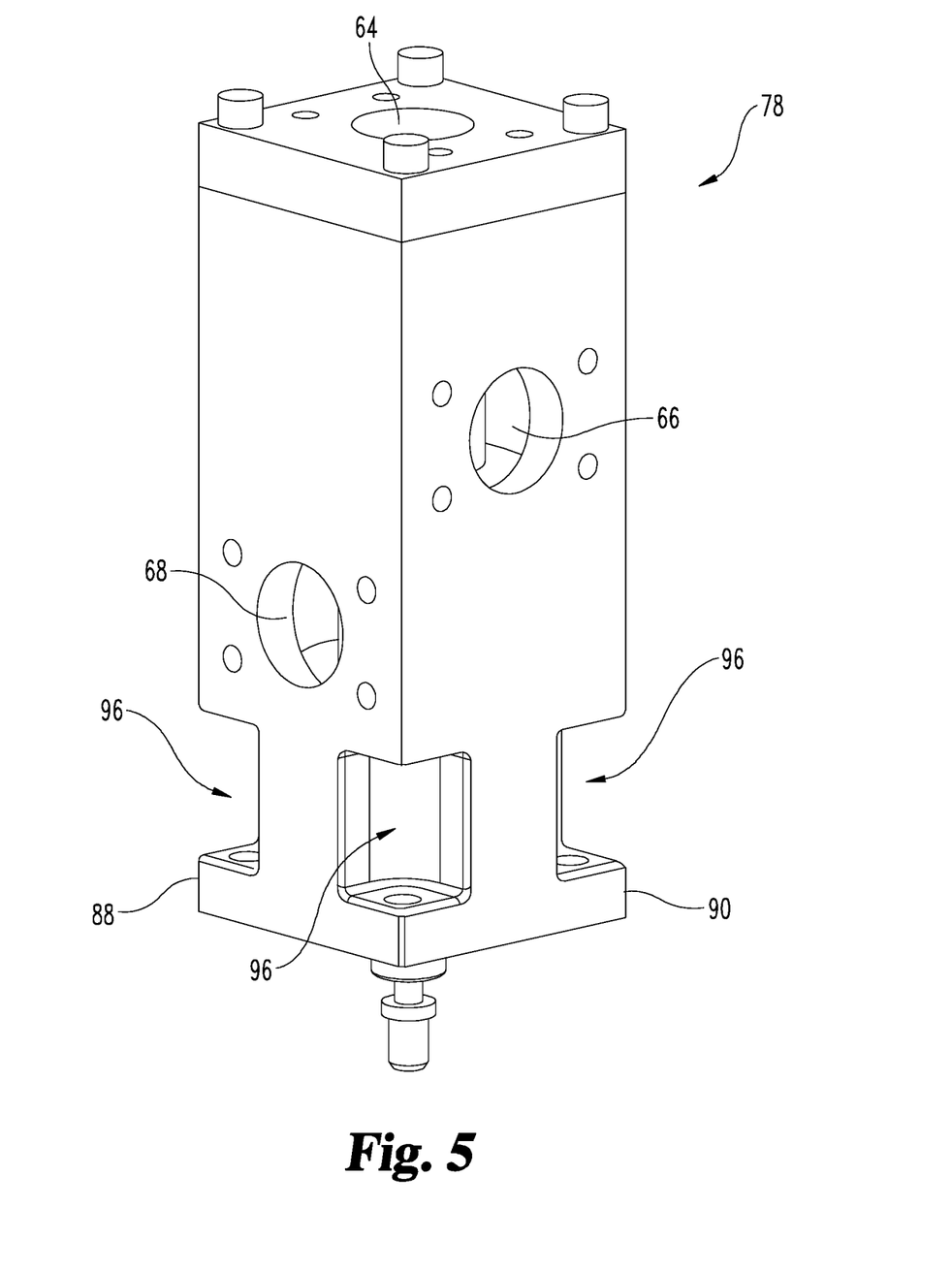
FIG. 5 depicts an embodiment of a thermal valve unit.
Figure 6:
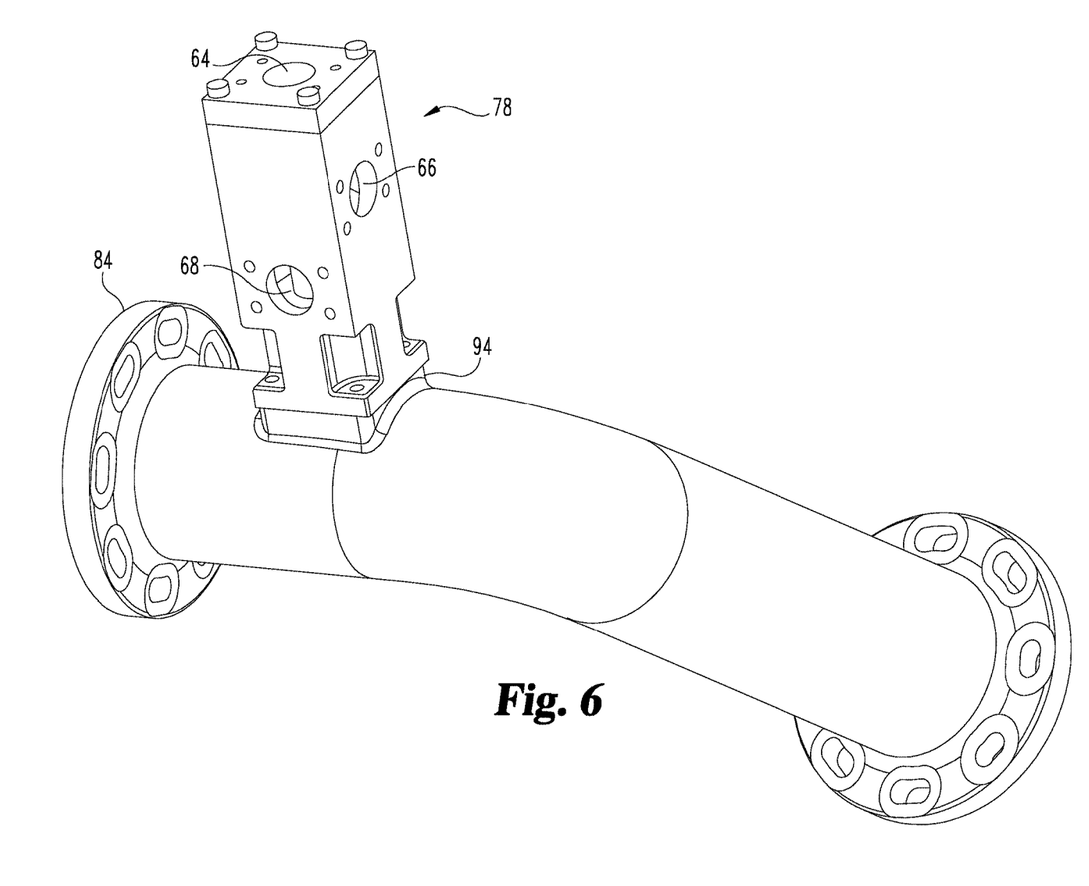
FIG. 6 depicts an embodiment of a thermal valve unit upon a pipe.

Turning now to FIGS. 5 and 6, an alternative embodiment of the thermal valve unit 78 is shown which includes pockets 96 are formed. Such pockets 96 can be formed in the housing 96

Figure 7:
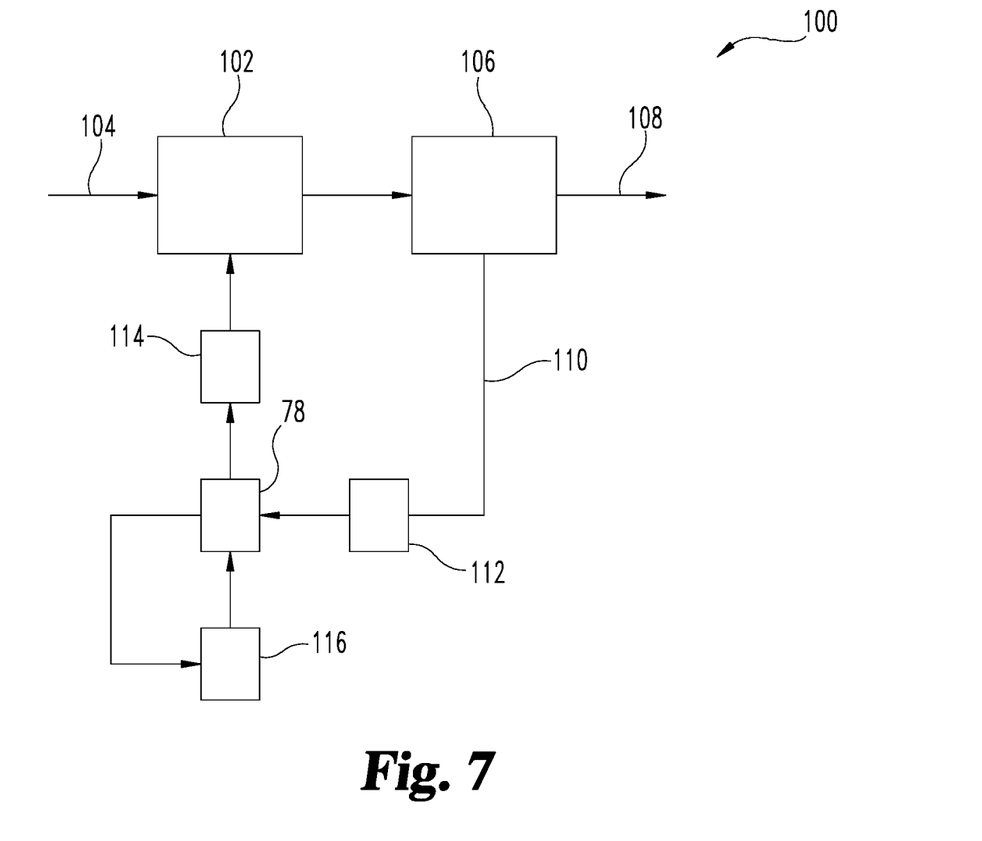
FIG. 7 depicts a schematic of a thermal valve unit in use with a compression system.

Turning now to FIG. 7, an embodiment of the thermal valve unit 78 affixed upon a pipe segment 80 can be integrated into a compression system 100 having a variety of components (some of which were discussed above). The compression system can include an oil filled screw compressor 102 that receives air 104 to be compressed and delivered to a customer. The compressor 102 provides a mixed stream of compressed air and oil to a separator 106 which provides for a compressed air output 108 and a separated oil flow 110. The oil flow 110 is provided to a sump 112 which collects the oil before routing the oil to the thermal valve unit 78. Based on a temperature of air traversing through the pipe 80, the thermal valve unit 78 can actuate to either route the oil from the sump 112 direct to a filter 114, or route the oil to a heat exchanger 116 (such as an oil cooler) prior to delivering the oil to the filter 114. The filter 114 can remove contaminate from the oil before delivering the oil for use in the compressor 102. The pipe segment 80 to which the thermal valve unit 78 is affixed can represent a segment located either downstream or upstream of the compressor 102.

One aspect of the present application provides an apparatus comprising a compressor thermal valve unit having: a thermal valve housing having an exterior shell that includes a plurality of apertures through which a fluid can traverse, the housing enclosing an interior having a plurality of passages in fluid communication with the plurality of apertures and through which fluid from the apertures can pass, a base disposed near an end of the thermal valve and structured to support the thermal valve when it is affixed to a compressed air system pipe, the base having a thickness that extends from a bottom surface and a footprint defined in part by a lateral length, the bottom surface of the base having a shape complementary to an external side surface of the pipe, wherein the thickness is shorter than the lateral length, and wherein the lateral length extends along an axial direction of the pipe, and a thermal valve having a valve body coupled to a thermally responsive element, the valve body structured to move in response to excitation of the thermally responsive element to open and close one or more of the plurality of passages within the thermal valve housing.

A feature of the present application further includes a neck disposed between the thermal valve housing and the base, wherein the neck includes a cross sectional area smaller than a cross sectional area of the thermal valve housing and smaller than a cross sectional area of the thermal valve base.

Another feature of the present application further includes wherein the exterior shell includes a plurality of opposing faces within which are formed the plurality of apertures.

Yet another feature of the present application further includes a pipe to which the thermal valve unit is affixed, the pipe having an inlet and an outlet and a side opening aperture that permits fluid flowing from the inlet to outlet to contact a portion of the thermal valve unit.

Still another feature of the present application further includes a sealant disposed between the base and the external side surface.

Yet still another feature of the present application further includes wherein the external side surface includes an embossment upon which the base is coupled, wherein the sealant is an O-ring, and wherein the O-ring disposed between the embossment and the base.

Yet another feature of the present application further includes the compressor, an oil filter, and an oil heat exchanger.

Still yet another feature of the present application further includes wherein the thermal valve unit is a unitary standalone component manufactured separately from the pipe.

Another aspect of the present application includes an apparatus comprising a compressor valve unit for use with a compressor and having a housing within which is contained a plurality of reconfigurable fluid flow paths, a temperature responsive element disposed within the compressor valve unit and coupled to a movable valve member, the temperature responsive element configured to actuate the movable valve member from a first position to a second position, the first position connecting a main inlet to a main outlet, the second position connecting the main inlet to a heat exchanger outbound port and a heat exchanger inbound port to the main outlet, and a mounting base disposed at an end of the compressor valve unit for an external contact with a compressor pipe, the mounting base having a lateral periphery in the circumferential and axial directions with dimensions sized to close off an accessory opening formed in an outer surface of the compressor pipe, the accessory opening oriented transverse to a bulk fluid flow path of the compressor pipe.

A feature of the present application further includes wherein the mounting base includes a recess configured to receive a sealing member, wherein the pipe to which the mounting base is configured to mount is annular in nature, and wherein the mounting base forms a non-annular shape.

Another feature of the present application further includes wherein the mounting base is planar and includes a groove into which can be fitted a sealing member.

Still another feature of the present application further includes wherein the reconfigurable fluid flow paths are in fluid communication with the main inlet, the main outlet, the heat exchanger outbound port, and the heat exchanger inbound port, and wherein the housing includes a plurality of faces within which are located the main inlet, the main outlet, the heat exchanger outbound port, and the heat exchanger inbound port.

Yet another feature of the present application further includes wherein the housing is quadrilateral in cross sectional shape such that the main inlet, main outlet, heat exchanger outbound port, and heat exchanger inbound port are dispersed around the housing, and wherein the compressor valve unit further includes a neck between the housing and the mounting base.

Still yet another feature of the present application further includes a pipe having an internal passage structured to convey fluid between opposing openings on either end of the pipe, the pipe further including the accessory opening.

Yet still another feature of the present application further includes wherein the outer surface of the compressor pipe further includes an embossment to which is attached the compressor valve unit.

Still yet another feature of the present application further includes wherein the embossment includes a planar mounting surface, wherein the mounting base includes a planar base surface, and wherein the planar base surface is configured to mount direct to the planar mounting surface of the embossment.

Still another feature of the present application further includes the compressor, an oil filter, and an oil heat exchanger.

Yet another aspect of the present application includes a method comprising providing a pipe having a pipe segment defined by opposing pipe ends having respective openings through which fluid can pass, and a lateral opening formed in the surface of the pipe which extends between the opposing pipe ends, installing a thermal valve unit upon an exterior of the pipe segment, the thermal valve unit having a temperature responsive member exposed to a fluid within an interior of the pipe, the temperature responsive member capable of actuating a valve body upon a change in temperature, as a result of the contacting, covering the lateral opening formed in the surface of the pipe with a base of the thermal valve unit such that the thermal valve unit predominately rests external to the, and coupling a plurality of conduits to complementary openings formed in a housing of the thermal valve unit.

A feature of the present application further includes installing a sealing device between the thermal valve unit and the lateral opening.

Another feature of the present application further includes wherein the sealing device is an O-ring, and wherein the coupling includes rotating a threaded coupler to secure at least one of the plurality of conduits to the thermal valve unit.

Still another feature of the present application further includes wherein the installing includes inserting the temperature responsive member into an interior fluid passage space of the pipe, the interior fluid passage space extending between the opposing pipe ends, and which further includes affixing an embossment to the pipe segment, the embossment forming the lateral opening of the pipe.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus comprising:
   a compressor thermal valve unit having:
   a thermal valve housing having an exterior shell that includes a plurality of apertures through which a first fluid can traverse, the housing enclosing an interior having a plurality of passages in fluid communication with the plurality of apertures and through which the first fluid from the apertures can pass;
   a base disposed near an end of the thermal valve housing and structured to support the thermal valve when affixed to a compressed air system pipe, the base having a thickness that extends from a bottom surface and a footprint defined in part by a lateral length, the bottom surface of the base having a shape complementary to an external side surface of the pipe, wherein the thickness is shorter than the lateral length, and wherein the lateral length extends along an axial direction of the pipe; and
   a thermal valve having a valve body coupled to a thermally responsive element, the thermally responsive element in thermal contact via intermediate structure or directly exposed to compressed air which traverses the compressed air system pipe during operation, the thermally responsive element configured to directly assess temperature of the compressed air, the valve body structured to move in response to excitation of the thermally responsive element from a temperature of the compressed air so as to open and close one or more of the plurality of passages within the thermal valve housing for the passage of the first fluid.

2. The apparatus of claim 1, which further includes a neck disposed between the thermal valve housing and the base, wherein the neck includes a cross sectional area smaller than a cross sectional area of the thermal valve housing and smaller than a cross sectional area of the thermal valve base.

3. The apparatus of claim 2, wherein the exterior shell includes a plurality of opposing faces within which are formed the plurality of apertures.

4. The apparatus of claim 1, which further includes a pipe to which the thermal valve unit is affixed, the pipe having an inlet and an outlet and a side opening aperture that permits fluid flowing from the inlet to outlet to contact a portion of the thermal valve unit.

5. The apparatus of claim 4, which further includes a sealant disposed between the base and the external side surface.

6. The apparatus of claim 5, wherein the external side surface includes an embossment upon which the base is coupled, wherein the sealant is an O-ring, and wherein the O-ring disposed between the embossment and the base.

7. The apparatus of claim 5, which further includes the compressed air system pipe, a compressor structured to provide the compressed air to traverse the compressed air system pipe, an oil filter, and an oil heat exchanger, and wherein the first fluid is oil.

8. The apparatus of claim 7, wherein the thermal valve unit is a unitary stand-alone component manufactured separately from the pipe.

9. An apparatus comprising:
   a compressor valve unit for use with a compressor and having a housing within which is contained a plurality of reconfigurable fluid flow paths structured to selectively flow a first fluid;
   a temperature responsive element disposed within the compressor valve unit and coupled to a movable valve member, the temperature responsive element configured to directly sense a temperature of a second fluid by virtue of being in thermal contact via intermediate structure or directly exposed to the second fluid and thereby actuate the movable valve member from a first position to a second position based upon the temperature of the second fluid, the first position connecting a main inlet to a main outlet, the second position connecting the main inlet to a heat exchanger outbound port and a heat exchanger inbound port to the main outlet; and a mounting base disposed at an end of the compressor valve unit for an external contact with a compressor pipe, the mounting base having a lateral periphery in the circumferential and axial directions with dimensions sized to close off an accessory opening formed in an outer surface of the compressor pipe, the accessory opening oriented transverse to a bulk fluid flow path of the compressor pipe.

10. The apparatus of claim 9, wherein the mounting base includes a recess configured to receive a sealing member, wherein the pipe to which the mounting base is configured to mount is annular in nature, and wherein the mounting base forms a non-annular shape.

11. The apparatus of claim 9, wherein the mounting base is planar and includes a groove into which can be fitted a sealing member.

12. The apparatus of claim 11, wherein the reconfigurable fluid flow paths are in fluid communication with the main inlet, the main outlet, the heat exchanger outbound port, and the heat exchanger inbound port, and wherein the housing includes a plurality of faces within which are located the main inlet, the main outlet, the heat exchanger outbound port, and the heat exchanger inbound port.

13. The apparatus of claim 12, wherein the housing is quadrilateral in cross sectional shape such that the main inlet, main outlet, heat exchanger outbound port, and heat exchanger inbound port are dispersed around the housing, and wherein the compressor valve unit further includes a neck between the housing and the mounting base.

14. The apparatus of claim 12, which further includes a pipe having an internal passage structured to convey fluid between opposing openings on either end of the pipe, the pipe further including the accessory opening.

15. The apparatus of claim 14, wherein the outer surface of the compressor pipe further includes an embossment to which is attached the compressor valve unit.

16. The apparatus of claim 15, wherein the embossment includes a planar mounting surface, wherein the mounting base includes a planar base surface, and wherein the planar base surface is configured to mount direct to the planar mounting surface of the embossment.

17. The apparatus of claim 16, which further includes the compressor, an oil filter, and an oil heat exchanger.

* * * * *